United States Patent [19]

d'Alayer de Costemore d'Arc

[11] Patent Number: 4,706,233
[45] Date of Patent: Nov. 10, 1987

[54] CONTROL SYSTEM FOR RECORD CHANGER APPARATUS

[75] Inventor: Stéphane M. A. d'Alayer de Costemore d'Arc, Genappe, Belgium

[73] Assignee: Staar S.A., Belgium

[21] Appl. No.: 846,092

[22] Filed: Mar. 31, 1986

[30] Foreign Application Priority Data

Apr. 30, 1985 [BE] Belgium .............................. 0/214939

[51] Int. Cl.⁴ ...................... G11B 17/00; G11B 17/22
[52] U.S. Cl. ........................................ 369/33; 369/30; 369/34; 369/36; 369/38
[58] Field of Search ...................... 369/33, 34, 36, 37, 369/38, 39, 30, 32; 434/336; 364/200

[56] References Cited

U.S. PATENT DOCUMENTS

| | | | |
|---|---|---|---|
| 3,789,365 | 1/1974 | Jen et al. | 364/200 |
| 4,052,798 | 10/1977 | Tomita et al. | 434/338 |
| 4,360,345 | 11/1982 | Hon | 434/428 |
| 4,527,265 | 7/1985 | D'Alayer | 369/244 |
| 4,609,358 | 9/1986 | Sangster | 434/336 |

OTHER PUBLICATIONS

New Product Announcement, Model No. SL-P16, Technics.

*Primary Examiner*—Steven L. Stephan
*Attorney, Agent, or Firm*—Leydig, Voit & Mayer

[57] ABSTRACT

A control system for a record changer apparatus having a plurality of record discs containing different kinds of information, such as entertainment, either music or video, and navigation information, Upon an interruption in operation, the operating positional location of a reproduction unit relative to the disc is determined and stored so as to permit the resumption of reading the information on that disc at the point of interruption or at a predetermined location when the reading of that disc is resumed.

9 Claims, 3 Drawing Figures

CONTROL SYSTEM FOR RECORD CHANGER APPARATUS

TECHNICAL FIELD

This invention relates to systems for reading information stored on information carriers such as record discs and magnetic tapes. More particularly, this invention relates to control systems for record changer apparatus permitting, by automatic and remote control, the changing of one record disc for another having a different kind of information.

BACKGROUND ART

Navigation systems are known using information carriers for storing cartographic data, such as road maps and navigation maps, as an aid in navigating vehicles, such as automobiles, on a trip. While magnetic tapes or discs may be used for storing such data, the invention has particular utility in connection with record discs storing information and capable of being read by laser for producing audio or video representations of the cartographic data stored on such navigation discs. For purposes of the following explanation of the background and the invention, reference will be made to record discs but it should be understood that this term is meant to cover discs or magnetic tapes stored in cassettes or the like.

Such navigation systems conventionally employ satellites, transmitter networks, or the like to fix the exact position of the receiver and combine that information with the cartography of a region from a record disc to enable a user of the system to navigate a vehicle by showing the user the direction and road to take to a desired destination.

The same type of record discs used for storing cartographic information to be reproduced in audio or video form are used for storing music and action entertainment for reproduction in audio or video form. It is now proposed that it would be desirable to provide an system having a magazine for receiving a plurality of record discs of both navigation and entertainment types, for example, reserving one compartment in the magazine for a navigation record disc and the other compartments of the magazine for entertainment record discs. Furthermore, it is proposed to employ a record changer for switching the playing between the record discs. Such a changer may be located in the trunk of a vehicle and operated by remote control by the driver.

In conventional record changer apparatus, a control system provides for successive or selective playing of the record discs according to a program selected by the user. When the operation of a program sequence is interrupted and the playing is subsequently resumed, it would be conventional for the apparatus to resume the playing of the record disc at the place of interruption, a system for storing the positional location of interruption being disclosed in U. S. Pat. No. 4,527,265, provided that the same sequence is followed as specified by the program.

If the sequence of the program is altered, the device disclosed in the aforesaid U.S. patent does not retain the positional information, which is erased, and a changer equipped with such a device simply provides for the playing of the selected disc.

This normal operational mode becomes a major handicap for a changer which provides for the selection of one or several record discs stored in a magazine containing information to be used by a system independent of the changer as, for example, a navigation system.

DISCLOSURE OF INVENTION

The principal object of this invention is to provide a control system for a record changer which permits changing a record disc having one kind of information, such as a music or video program, for another record disc having a different kind of information, such as navigation information, where the record changer apparatus is installed in a vehicle. In a successive reading operation when a navigation record disc is changed for a music or video program record disc and subsequently the record disc is again changed and the operation of the navigation record disc is resumed, it is an object of this invention to provide for resuming the reading operation on the navigation record disc at the same positional location where it was being read the preceding time it was being played.

A more specific object is to provide a control system for a record changer apparatus particularly suited for reading information on a navigation record disc intermixed with a number of entertainment record discs in a record storage magazine and capable of returning the reading head to the same positional location on the navigation record disc where the playing operation ended during a previous reading, thus calling up information as to the same locality on the map stored on the navigation disc where the preceding inquiry was concentrated.

BRIEF DESCRIPTION OF THE DRAWINGS

Accordingly, a preferred embodiment of the present invention will be explained in connection with the accompanying drawings, in which.

BEST MODE FOR CARRYING OUT THE INVENTION

Figure 1:
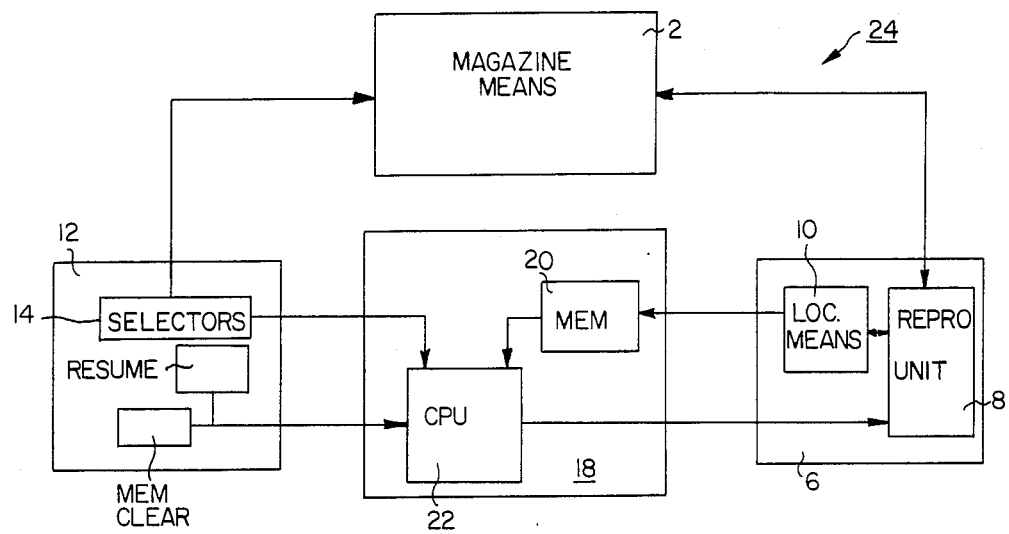
FIG. 1 is a schematic diagram of the control system for a record changer apparatus.

Referring to FIG. 1, which is a schematic diagram of a preferred embodiment of the present invention, there is shown a magazine means 2 for receiving a plurality of information carriers, herein shown as record discs 4. This magazine means 2 stores record discs 4 which are transferred by a record changer (not shown) to a reproduction device 6 having a reproduction unit 8 for playing or reading information stored on the record discs 4 transferred from the magazine means 2. The reproduction device 6 further includes a locating means 10 associated with the reproduction unit 8 for determining a precise operating location of the reproduction unit 8 relative to a selected record disc in operative position, which may be of the type described in U.S. Pat. No. 4,527,265.

A signal generating means 12 includes a selector panel 14 having selector elements 16 operable manually by a record disc user. A control means 18 is electrically connected to both the reproduction unit 8 and the signal generating means 12 to control the switching and reading operations of the record discs 4 in the reproduction unit 8. The control means 18 includes a memory means, herein shown as a RAM memory unit 20, for storing the positional location of the reproduction unit 8, as transmitted from the locating means 10, and a program-controlled CPU 22 for processing the information received from the memory unit 20 and the signal generating means 12 so as to control the operation of the reproduction unit 8 in a desired fashion. All of the above-mentioned elements constitute a control system 24.

Figure 2:
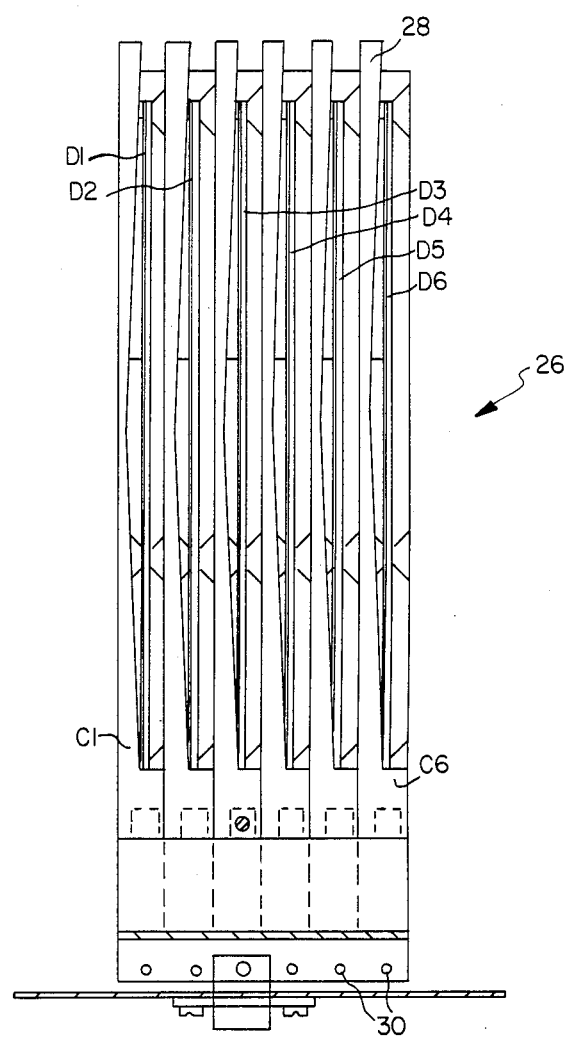
FIG. 2 is a front view of a magazine having separate compartments for storing record discs having different kinds of information recorded thereon.

In keeping with an aspect of the present invention, the magazine means 2 is illustrated in detail in FIG. 2. As can be seen, the magazine means 2 includes a magazine 26 having multiple compartments 28, each receiving a record disc 4 and having a mark 30 identifying the location of the compartment in the magazine 26. Each locating mark 30 corresponds to a selector element 16 provided on the selector panel 14 of the signal generating means 12. In this particular embodiment six storage compartments 28 are illustrated in the magazine 26 for receiving two discs containing navigation information at locations 1 and 2 and four entertainment discs at locations 3–6. It should be noted, however, that the magazine 26 may include any number of storage compartments 28 and the record discs may be located in a random fashion in the compartments so long as the compartments are identified by the control system as containing record discs having a particular kind of information. The magazine means 2 is included as part of a changer apparatus of the type, for example, disclosed in U.S. patent application Ser. No. 687,023, filed Dec. 28, 1984 and entitled "Rotary Changer for Compact Discs".

Figure 3:
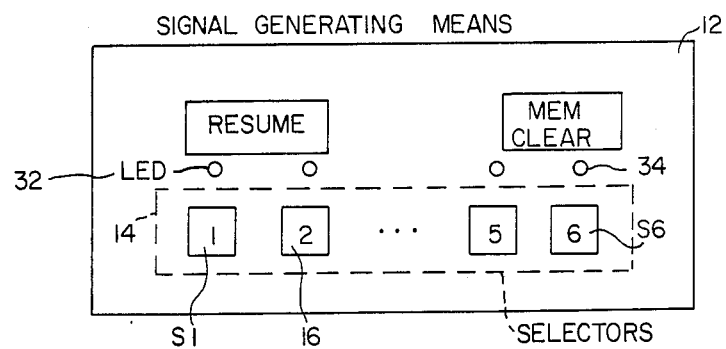
FIG. 3 is a schematic view of a selection panel of a signal generating means included in the control system.

FIG. 3 illustrates in further detail the signal generating means 12 which includes a series of push-button switches S1–S6 corresponding to the selector elements 16 and capable of generating command signals at the direction of the user. Also provided is a status means 32 including a luminous LED indicator 34 for each selector element 16 to indicate interruption in operation of a corresponding record disc 4. The signal generating means 12 further includes a RESUME switch key and a MEM CLEAR switch key, the operation of which will become clear when the operation of the control system is explained.

The operation of the control apparatus according to the invention can now be explained with reference to FIG. 3. For simplicity, the discs D1–D6 in storage compartments C1–C6 having identifying marks are referred by the corresponding selector elements S1–S6. It is further assumed that the magazine 26 is fixed and that the recording disc D5 in storage compartment C5 has been transferred to the reproduction unit 8. This represents a condition resulting from selector S5 having been activated and the record changer apparatus operated to transfer the recording disc D5 from the storage compartment S5 to the reproduction unit 8. The reproduction unit 8 is allowed to move across the surface of the disc D5 as the disc D5 is rotated. When the user desires to terminate reading of the entertainment information contained on the disc D5, the user then pushes another selector element 16, such as selector element S1, on the selector panel 14. This selection represents the interruption in operation of record disc D5 and corresponds to the activation of operation of record disc D1. Correspondingly, the LED indicator 34 above the selector element S5 is lit to indicate that operation of record disc D5 is interrupted. The operating location of the reproduction unit 8 relative to the record disc D5 is determined by the locating means 10 and recorded in the memory unit 20. At the same time, a first request signal is generated by the signal generating means 12 and sent to the CPU 22. Upon receipt of this request signal, the control means 18 generates a first control signal to the reproduction unit 8 which, in turn, returns disc D5 to its storage compartment C5 and transfers disc D1 into its operating position. The navigation information contained on disc D1 is read and sent to a navigation system (not shown) for processing. Disc D1 may include directions, maps, or the like, aiding the user to reach a desired destination. Upon completion, that is, when the user wishes to resume the operation of the entertainment disc D5, a second request signal is generated from the signal generating means 12 by pushing the RESUME switch key. The CPU 22, upon receiving this second request signal, obtains the operating location of the reproduction unit 8 at the point of interruption from the memory unit 20 and generates a second control signal to resume the operation of record disc D5. Record disc D1 is then returned to its storage compartment C1, record disc D5 is transferred to its operating position, and the reproduction unit is moved to the operating location where disc D5 was interrupted to resume the reproducing operation. As a result, disc D5 is continuously played even though interruption occurs. This eliminates the need for searching every time a disc is returned to its operating position and allows continuous monitoring of the information on a navigation map, for example, during the course of a trip even though the reading of navigation operation is interrupted for the playing of entertainment, such as music or video programs, stored on the entertainment discs of the equipment. On the other hand, when it is desired to resume the reading operation of disc D5 from the beginning rather than at the point of previous interruption, the user simply needs to activate the MEM CLEAR key on the selector panel 14 after pushing the RESUME key. By activating both control keys, two signals, one representing the clearing of memory and the other being the second control signal representing the resumption operation, are generated and sent to the CPU. The CPU first clears the memory unit 20 storing the operating location of the reproduction unit 8 prior to interruption and then generates a second control signal to operate the disc 5 from the beginning.

It is further recognized that a situation may occur in which it is no longer desired to resume the reproduction of the entertainment disc D5, either at the point of interruption or from the beginning, but instead to begin the reading operation of, for example, disc D6. In this instance, the user simply pushes selector key S6 to interrupt the operation of navigation disc D1, and the operating process is repeated, namely, the indicator 34 above selector key S1 is lit to indicate that the operation of disc D1 is now interrupted, the operating location of disc D1 is determined by the locating means 10 and stored in the memory unit 20, a first request signal is generated by the signal generating means 12 and sent to the CPU 22 of the control means 18 and, finally, the CPU 22 generates a first control signal to the reproduction unit 8 to return the navigation disc D1 to its storage compartment C1 and to bring the entertainment disc D6 into its operating position. It is noted that the operation of the magazine means 2 and the record changer apparatus are omitted for simplicity.

As shown, the discs may be repeatedly switched from one containing navigation information to an entertainment disc, or vice versa, and the reproducing operation may be interrupted and resumed as desired. Furthermore, the resumption of operation after an interruption may be selected to start at the point of interruption or at a predetermined location, which can be the beginning of a recording on a record disc, for example. In addition, since the control means includes a program-controlled CPU, different sequences of operation may be employed.

I claim:

1. A control apparatus for switching the reading operation between a plurality of record discs in an information-reproducing system comprising:
a plurality of record discs carrying information of two different types, one type of information being reproducible in video form and an other type being reproducible in audio form;
magazine means receiving said record discs including a first record disc carrying information of the one type and a second record disc carrying information of the other type;
reading means including a reproduction unit for conducting a reading operation for reading information on a record disc from said magazine means;
control means operable from an external source to interrupt the reading operation on a first record disc and to switch the reading operation to a second record disc, and to terminate the reading operation on the second record disc and to resume the reading operation on the first record disc;
locating means associated with said reproduction unit for determining a precise positional location where information is being read on a record disc when the reading operation is interrupted;
memory means electrically connected said locating means for storing the positional location where information is being read on the first record disc when the reading operation is interrupted and switched to the second record disc in response to operation from the external source; and
signal generating means for generating a first request signal in response to operation from the external source representing the activation of a reading operation on the second record disc and the interruption of the reading operation on the first record disc, and a second request signal in response to operation from the external source representing the termination of the reading operation on the second record disc and the resumption of the reading operation on the first record disc;
said control means being connected to receive and responsive to the first request signal from said signal generating means to product a first control signal to activate the reproduction unit to read information on the second record disc and responsive to the second request signal from said signal generating means to produce a second control signal to activate the reproduction unit to resume reading information on the first record disc at the positional location stored in said memory means.

2. A control apparatus according to claim 1 further including means for clearing the memory means and for producing a third control signal to activate the reproduction unit to resume reading information on the first record disc at a predetermined positional location.

3. A control apparatus according to claim 1 wherein said memory means stores the positional location where information is being read on the second record disc when the reading operation thereon is terminated.

4. A control apparatus according to claim 3 wherein the second control signal produced by said signal generating means is used to activate the reproduction unit to read information from a record disc from said magazine means different from said first record disc.

5. A control apparatus according to claim 3 wherein said memory means includes a non-volatile ROM-type memory unit.

6. A control apparatus for switching the reading operation between a plurality of information carriers in an information-reproducing system comprising:
a plurality of carriers carrying information of two different types, one type of information being reproducible in video form and one type of information being reproducible in audio form;
magazine means receiving said information carriers including at least one carrier carrying information of each type;
reading means including a reproduction unit for conducting a reading operation for reading information on an information carrier received from said magazine means;
control means operable from an external source to interrupt the reading operation on first information carrier having one type of information and to switch the reading operation to a second information carrier having the other type of information, and to interrupt the reading operation on the second information carrier and to resume the reading operation on the first information carrier;
locating means associated with said reproduction unit for determining a precise positional location where information is being read on an information carrier when the reading operation is interrupted; and
memory means electrically connected to said locating means for storing the positional location where information is being read on the first information carrier when the reding operation is interrupted and switched to the second information carrier in response to operation from the external source;
said control means being responsive to operation from the external source to activate the reproduction unit to read information on the first information carrier at the positional location stored in said memory means after resuming the reading operation following interruption for reading information on the second information carrier.

7. A control apparatus according to claim 6 further including means for clearing the memory means and for activating the reproduction unit to resume reading information on the first information carrier at a predetermined positional location.

8. A control apparatus according to claim 6 wherein said memory means stores the positional location where information is being read on the second information carrier when the reading operation thereon is terminated.

9. A control apparatus according to claim 6 wherein said memory means includes a non-volatile ROM-type memory unit.

* * * * *